US008756169B2

(12) United States Patent
Bowers et al.

(10) Patent No.: US 8,756,169 B2
(45) Date of Patent: Jun. 17, 2014

(54) FEATURE SPECIFICATION VIA SEMANTIC QUERIES

(75) Inventors: Stuart Bowers, Redmond, WA (US); Tom Jackson, Redmond, WA (US); Jim Karkanias, Sammamish, WA (US); Dave Campbell, Sammamish, WA (US); Brian Aust, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 684 days.

(21) Appl. No.: 12/959,375

(22) Filed: Dec. 3, 2010

(65) Prior Publication Data

US 2012/0143793 A1 Jun. 7, 2012

(51) Int. Cl.
*G06F 17/30* (2006.01)

(52) U.S. Cl.
CPC .................................. *G06F 17/3043* (2013.01)
USPC .......................................................... 706/12

(58) Field of Classification Search
USPC ..................................................... 706/12, 62
See application file for complete search history.

(56) References Cited

U.S. PATENT DOCUMENTS

| 5,974,412 | A  | 10/1999 | Hazlehurst et al. |
| 7,007,017 | B2 | 2/2006  | Bergholz et al. |
| 7,120,626 | B2 | 10/2006 | Li et al. |
| 7,644,052 | B1 | 1/2010  | Chang et al. |
| 2006/0160070 | A1 | 7/2006 | Mallal et al. |
| 2006/0195406 | A1 | 8/2006 | Burges et al. |
| 2006/0206479 | A1 | 9/2006 | Mason |
| 2006/0245641 | A1 | 11/2006 | Viola et al. |
| 2008/0208836 | A1 | 8/2008 | Zheng et al. |
| 2009/0254336 | A1 | 10/2009 | Dumais et al. |
| 2009/0287678 | A1* | 11/2009 | Brown et al. ..................... 707/5 |
| 2010/0153440 | A1 | 6/2010 | Hubert |

OTHER PUBLICATIONS

B. Jelen and M. Alexander, Pivot Table Data Crunching, Que (publisher), Jun. 21, 2005, pp. 9-15 and 155-169.*
Q. Zhou, et al., "SPARK: Adapting Keyword Query to Semantic Search", ISWC/ASWC 2007, pp. 694-707.*
H. Ritter and T. Kohonen, "Self-Organizing Semantic Maps", Biol. Cybern., vol. 61, pp. 241-254, 1989.*
Raghavan, et al., "Active Learning with Feedback on Both Features and Instances" Retrieved at << http://jmlr.csail.mit.edu/papers/volume7/raghavan06a/raghavan06a.pdf >>, Journal of Machine Learning Research 7 (2006) 1655-1686.
Meij, et al., "Learning Semantic Query Suggestions" Retrieved at << http://staff.science.uva.nl/~mdr/Publications/Files/iswc2009-slfa.pdf >>, 2009, pp. 17.

\* cited by examiner

*Primary Examiner* — Kakali Chaki
*Assistant Examiner* — Vincent Gonzales
(74) *Attorney, Agent, or Firm* — Damon Rieth; Jim Ross; Micky Minhas

(57) ABSTRACT

Technology is described that includes a method of feature specification via semantic queries. The method can include the operation of obtaining a data set having an identifier for each data row and a plurality of data features for each data row. A semantic query can be received that can be applied to the dataset that is usable by a machine learning tool. A entity feature map can be supplied that has entities and associated features for use by the machine learning tool. Further, a query structure can be analyzed using the entity feature map to identify input from the dataset for the machine learning tool.

20 Claims, 4 Drawing Sheets

| # | F | M |
|---|---|---|
| F1 | Hp | 200 |
| F1 | Wt | 3000 |
| F2 | Hp | 350 |
| F2 | Wt | 4000 |
| F3 | Hp | 150 |
| F3 | Wt | 2000 |

| # | Hp | Wt |
|---|---|---|
| F1 | 200 | 3000 |
| F2 | 350 | 4000 |
| F3 | 150 | 2000 |

FEATURE SPECIFICATION VIA SEMANTIC QUERIES

BACKGROUND

Typical approaches to enable machine learning in end user applications request the user to specify one column for each feature to be analyzed and assume one row for each sample of data to be analyzed by the machine learning system. This approach works well with both data cubes and spreadsheets for most business analytics data but can scale poorly in situations when: the input data has hundreds or thousands of features per row or sample, the data is sparse, or the available features are not known a priori to the user. For example, life sciences data frequently references measurements for thousands of genes for each sample, and correspondingly this data is often stored as thousands of measurement events associated with each sample. Such data arrangements can make machine learning on the data sets challenging.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. While certain disadvantages of prior technologies are noted above, the claimed subject matter is not to be limited to implementations that solve any or all of the noted disadvantages of the prior technologies.

Various embodiments are described for a method of feature specification via semantic queries. The method can include the operation of obtaining a data set having an identifier for each data row and a plurality of data features for each data row. A semantic query can be received that can be applied to the dataset that is usable by a machine learning tool. A entity feature map can be supplied that has entities and associated features for use by the machine learning tool. Further, a semantic query structure can be analyzed using the entity feature map to identify input retrieved by the semantic query from the dataset for the machine learning tool.

A system can be provided for transforming and summarizing data. The system can include a database storage module to store a data set, and the data set may have an identifier for each data row and a plurality of data features for each data row. An interface module can obtain a semantic query and entity feature map having entities and associated attributes. The semantic query may be obtained from an end user. A machine learning tool can receive and use query results based on the analysis of the semantic query using the entity feature map. In addition, a summary module can create a summary table of a portion of the data set containing column and row groupings selected for the machine learning tool based on the entity feature map.

DETAILED DESCRIPTION

Figure 1:
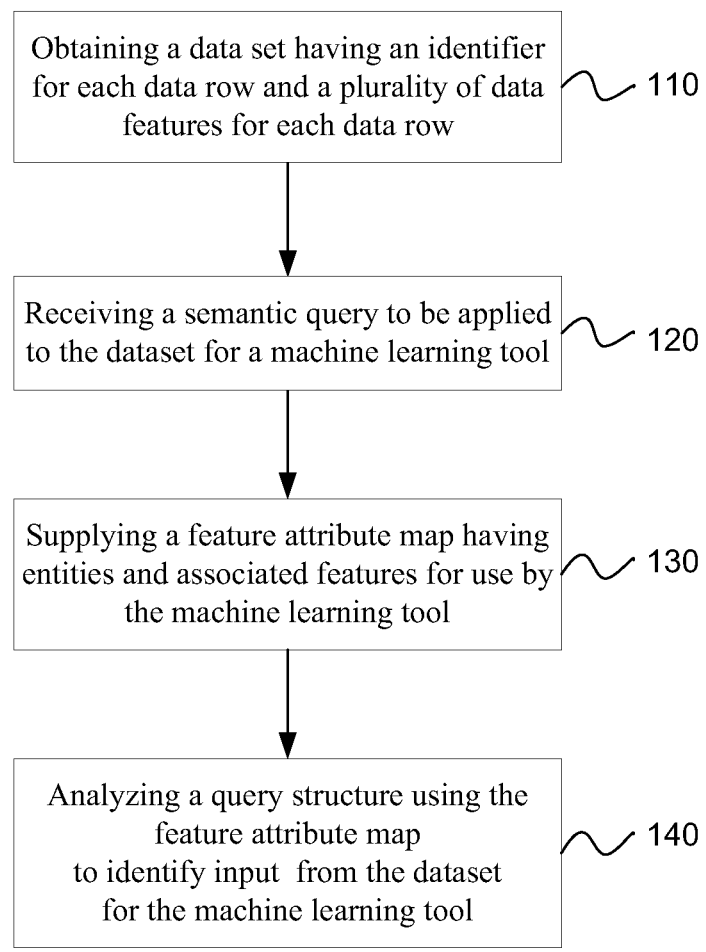
FIG. 1 is a flow chart illustrating an example method of feature specification via semantic queries.

Reference will now be made to the exemplary embodiments illustrated in the drawings, and specific language will be used herein to describe the same. It will nevertheless be understood that no limitation of the scope of the technology is thereby intended. Alterations and further modifications of the features illustrated herein, and additional applications of the embodiments as illustrated herein, which would occur to one skilled in the relevant art and having possession of this disclosure, are to be considered within the scope of the description.

A technology is provided for feature specification to enable machine learning over the results of semantic queries. Example systems and methods can allow a user to specify columns in a result set that reflect feature-measurement pairs. This allows simple semantic queries to select out thousands of features over hundreds of samples in a limited number of columns. For example, as few as three columns may be used.

Feature association maps can be used to define the input to machine learning tools. The machine learning tools may include machine learning methods that are both supervised and unsupervised. In addition, the technology can provide the potentially automated detection of which map projections represent unique IDs and feature-measurement pairs.

FIG. 1 illustrates a method of feature specification via semantic queries. The method can include the operation of obtaining a data set having an identifier for each data row and a plurality of data features for each data row, as in block 110. Each data row may represent a data sample or a data record for a specific object or event.

A semantic query that has been received can be applied to the data set for a machine learning tool, as in block 120. The semantic query can be received from a user. The semantic query can help a user to obtain or manipulate data in a database without knowing the detailed syntactic structure of a database or a structured query that may be generated by the semantic query. Even where a detailed query language is used, the semantic query language may hide the details of the underlying database organization. Semantic queries can be processed by a semantic query engine that can be applied to an underlying structured database.

A entity feature map can be supplied where the entity feature map provides the associated features for each entity for use by the machine learning tool, as in block 130. The entity feature map can have entity-feature pairs. More specifically, the entity feature map can include entities having associated attributes and value identifiers.

A semantic query structure can then be analyzed using the entity feature map to identify input from the data set retrieved by the semantic query for the machine learning tool, as in block 140. In one example, a table can be retrieved that is used directly by the machine learning tool. Alternatively, a table that has been filtered by the entity feature map can be used by the machine learning tool. Another example result of the analysis operation is that a summary table of a portion of the data set containing the column and row groupings selected can be created and pivoted based on the entity feature map. This summary table can then be used by the machine learning tool.

In the case where some rows do not have the columns that other rows include or some rows do not have data in every column, then there may be some data elements in the query result that are empty when the semantic data query is executed. As a result, the entity feature map can instruct the machine learning tool to fill attributes values that do not exist for a given entity or attribute in a data sample with null values. These null values can then be treated in the machine learning method.

The machine learning tool discussed can be a machine learning tool that uses supervised machine learning methods. Examples of the supervised machine learning methods can include logistic regression and classification. Alternatively, the machine learning tool may use unsupervised machine learning methods.

The machine learning tool can use the data set that has been retrieved based on the entity feature map to capture characteristics of the features and the features' unknown underlying probability distribution. Thus, the machine learning tool can generalize from the given examples to produce a useful output in new cases submitted to the machine learning tool for analysis.

In an example of a logistic regression, the entity feature map is used to provide data to the machine learning tool for prediction of the probability of a sample type or an event by fitting data to a logistic curve. Like many forms of regression analysis, several predictor variables can be used that may be either numerical or categorical. For example, the probability that a person will be readmitted to the hospital within a specified time period might be predicted from knowledge of the person's personal profile data and details about the illness that was experienced. In the case of analyzing data with a large number of attributes, such as DNA data, the entity feature map may map out certain combinations of DNA attributes of interest that can be fed to the machine learning tool to enable learning on how certain portions or combinations of DNA affect certain human diseases.

As discussed before, the described technology allows a user to specify columns in a result set that reflect feature-measurement pairs. This allows simple semantic queries to select out thousands of features over hundreds of samples in as few as three columns.

Figure 2:
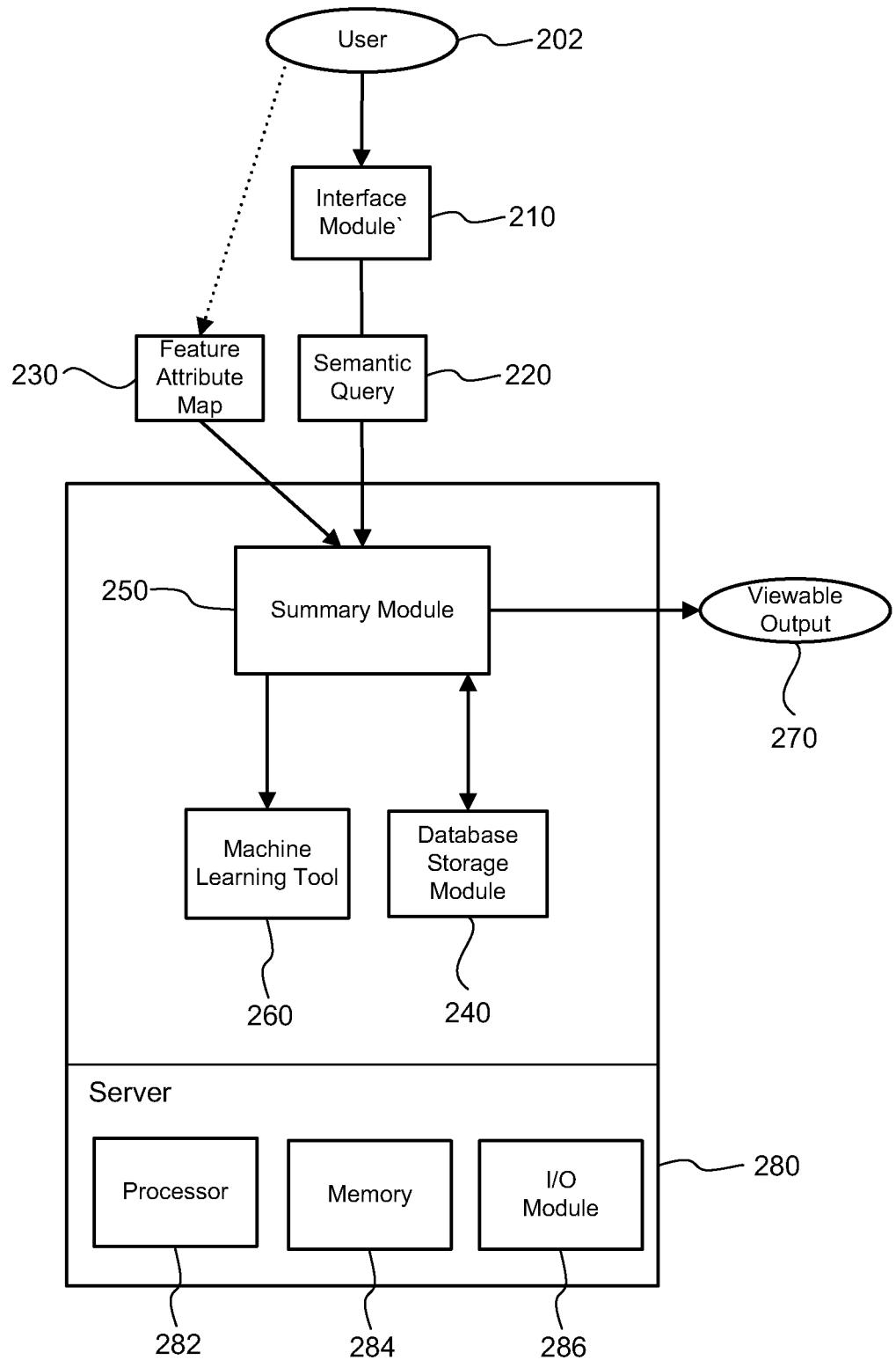
FIG. 2 is block diagram illustrating an example system for transforming and summarizing data using a entity feature map.

FIG. 2 illustrates a system for transforming and summarizing data. The system can include a database storage module 240 to store a data set having an identifier for each data row and a plurality of data features for each data row. The identifier may be a unique identifier for a given data row or row for a sample.

An interface module 210 can be included in the system to obtain a semantic query and entity feature map 230 having entities and associated attributes. The user 202 can designate or supply a semantic query for which the user desires to obtain results. For example, the user 202 can request the results for all flower samples that have a flower name, a part name, a dimension name and value for the dimension. The entity feature map can also instruct the machine learning tool to fill values that do not exist for a given entity or attribute in a data sample with null values.

A machine learning tool 260 can be configured to receive and use query results based on the analysis of the semantic query using the entity feature map. As discussed before, the machine learning tool can use supervised or unsupervised machine learning methods.

In addition, a summary module 250 can be used to create a summary table of a portion of the data set containing column and row groupings selected for supplying to the machine learning tool based on the entity feature map.

Certain modules in the system may execute on a server 280, workstation or another computing device that has a processor 282 or digital processing device. The server or computing device may include a hardware memory device 284 that can interact with the processor. The hardware memory device may be RAM, SDRAM, Flash RAM, field programmable gate array (FPGA), a state change memory device, or another type of volatile or non-volatile memory device. An I/O module 286 can interact with the processor and memory device using a bus to provide viewable output 270 that can be used by an end user. For example, a summary output of a data mining operation on a data table can be provided to an end user. Alternatively, the I/O module can provide the data output of the summary module to the machine learning tool.

Examples of the modules that may execute on a server or computing device may include the summary module 250, database storage module 240, and the machine learning tool module 260. These modules may also operate on independent servers, if desired. The interface module 210 may execute on the server and be accessed through a graphical user interface (GUI) on the server. Alternatively, the interface module may be executed remotely using a web browser, thin client or other client type of technology, and the interface module may communicate with the server through a computer network.

As an example of a data set that can assist in describing this technology, the Iris data set can be used and the Iris flower data set or Fisher's Iris data set is a multivariate data set introduced by Sir Ronald Aylmer Fisher decades ago as an example of discriminant analysis. This dataset is sometimes called Anderson's Iris data set because Edgar Anderson collected data to quantify the geographic variation of Iris flowers in the Gaspé Peninsula of Canada.

The dataset consists of 50 samples from each of three species of Iris flowers (*Iris setosa, Iris virginica* and *Iris versicolor*). Four features were measured from each sample, and the samples are the length and the width of sepal and petal, in centimeters. Based on the combination of the four features, Fisher developed a linear discriminant model to distinguish the species from each other.

The Iris data set can be stored with a specific predicate for each measurement, or by specifying measurement events and the corresponding values. With only four features either approach works quite well, but the method by which the information is queried can vary substantially. Notably, if an end user simply wants to view all the measurements taken, the respective queries can be used below as shown in the SPARQL query language:

---

QUERY 1

---

PREFIX IRIS:<urn://Iris/>
SELECT ?Species ?PetalWidth ?PetalLength ?SepalWidth ?SepalLength
WHERE
{
   ?Flower      IRIS:Flower.Petal      ?Petal;
                     IRIS:Flower.Sepal     ?Sepal;
                     IRIS:Flower.Species  ?Species.
   ?Petal       IRIS:Dimension.Width  ?PetalWidth;
                     IRIS:Dimension.Length ?PetalLength.
   ?Sepal       IRIS:Dimension.Width  ?SepalWidth;
                     IRIS:Dimension.Length ?SepalLength.
}

---

Query 1 above can return a row that displays every sample that has a flower name, a part name, a dimension name and a measurement value. In this first example case, a standard data cube or grid may be output. Table 1 illustrates an example of data cube output from Fisher's Iris Data set.

TABLE 1

Fisher's Iris Data

| Sepal Length | Sepal Width | Petal Length | Petal Width | Species |
|---|---|---|---|---|
| 5.1 | 3.5 | 1.4 | 0.2 | *Setosa* |
| 4.9 | 3.0 | 1.4 | 0.2 | *Setosa* |
| 4.7 | 3.2 | 1.3 | 0.2 | *Setosa* |
| 4.6 | 3.1 | 1.5 | 0.2 | *Setosa* |

In contrast, Query 2 is shown below and provides a series of measurements that are returned specifying the part, dimension and value in question. This latter approach gives the data a shape that makes the data difficult to use with existing data mining tools because each row contains an unknown number of attributes or columns, where Query 1 provided one line per measured feature.

QUERY 2

```
PREFIX Iris:<urn://Iris6/>
SELECT ?f ?part ?d ?value ?species
{
    ?m Iris:Measurement.Flower        ?f.
    ?m Iris:Measurement.Part          ?part.
    ?m Iris:Measurement.Dimension     ?d.
    ?m Iris:Measurement.Value         ?value.
    ?f Iris:Flower.Species            ?species.
}
```

The following illustrated Query 3 may retrieve the measurements for gene expression in a specific study on cancer. This data has more than 15,000 dimensions.

The following two queries (i.e., Query 3 and Query 4) provide enough information to train a machine learning algorithm to predict outcomes based on genetic measurements.

QUERY 3

```
PREFIX Gene:<urn://GeneData/>
SELECT ?PatientID ?outcome {
    ? PatientID Gene:Patient.Outcome    ?outcome.
}
```

| PatientID | Outcome |
|---|---|
| 01 | Positive |
| 02 | Negative |
| 03 | Positive |
| ... | ... |

QUERY 4

```
PREFIX Gene:<urn://GeneData/>
SELECT ?PatientID ?GeneName ?Value
{
    ?PatientID Gene:Patient.Measurement            ?MeasurementID
    ?MeasuementID Gene:Measurement.GeneName        ?GeneName.
    ?MeasurementID Gene:Measurement.Value          ?Value.
}
```

| PatientID | GeneName | Value |
|---|---|---|
| 01 | BRCA1 | 1.5 |
| 01 | COX2 | 0.9 |
| 02 | BRCA1 | 0.95 |
| 02 | COX2 | 1.1 |

-continued

QUERY 4

| | | |
|---|---|---|
| 03 | BRCA1 | 1.7 |
| 03 | COX2 | .85 |
| ... | ... | ... |

These two result sets can be combined into a single table by treating outcome as 'True' or 'False' for being "Positive". This gives:

| Entity | Feature | Value |
|---|---|---|
| 01 | BRCA1 | 1.5 |
| 01 | COX2 | 0.9 |
| 02 | BRCA1 | 0.95 |
| 02 | COX2 | 1.1 |
| 03 | BRCA1 | 1.7 |
| 03 | COX2 | .85 |
| 01 | PositiveOutcome | True |
| 02 | PositiveOutcome | False |
| 03 | PositiveOutcome | True |
| ... | ... | ... |

Rather than requiring two queries, the same final entity feature map may be created automatically from the query:

QUERY 5

```
PREFIX Gene:<urn://GeneData/>
SELECT ?PatientID ?GeneName ?Value ?Outcome
{
    ? PatientID Gene:Patient.Outcome               ?Outcome.
    ?PatientID Gene:Patient.Measurement            ?MeasurementID
    ?MeasuementID Gene:Measurement.GeneName        ?GeneName.
    ?MeasurementID Gene:Measurement.Value          ?Value.
}
```

Notice the similarity in form of Query 5 to Query 2.

Even if an approach analogous to MDX (multidimensional expressions) with SQL (structured query language) were used to attempt a transform of the data, the user would need to understand complex modifications to the SPARQL query language. Rather, this technology also enables the simple specification or auto-detection of certain elements in order to enable rotation and summarization of data in a summary table.

More specifically, the column that uniquely identifies each sample can be identified. In addition, the columns which can be composed to form a feature name and associated measurement can be detected. Further, the columns which are one-to-one with each sample can be found. In other words, columns that are already in one-to-one format are columns that are already in grid format.

Figure 3:
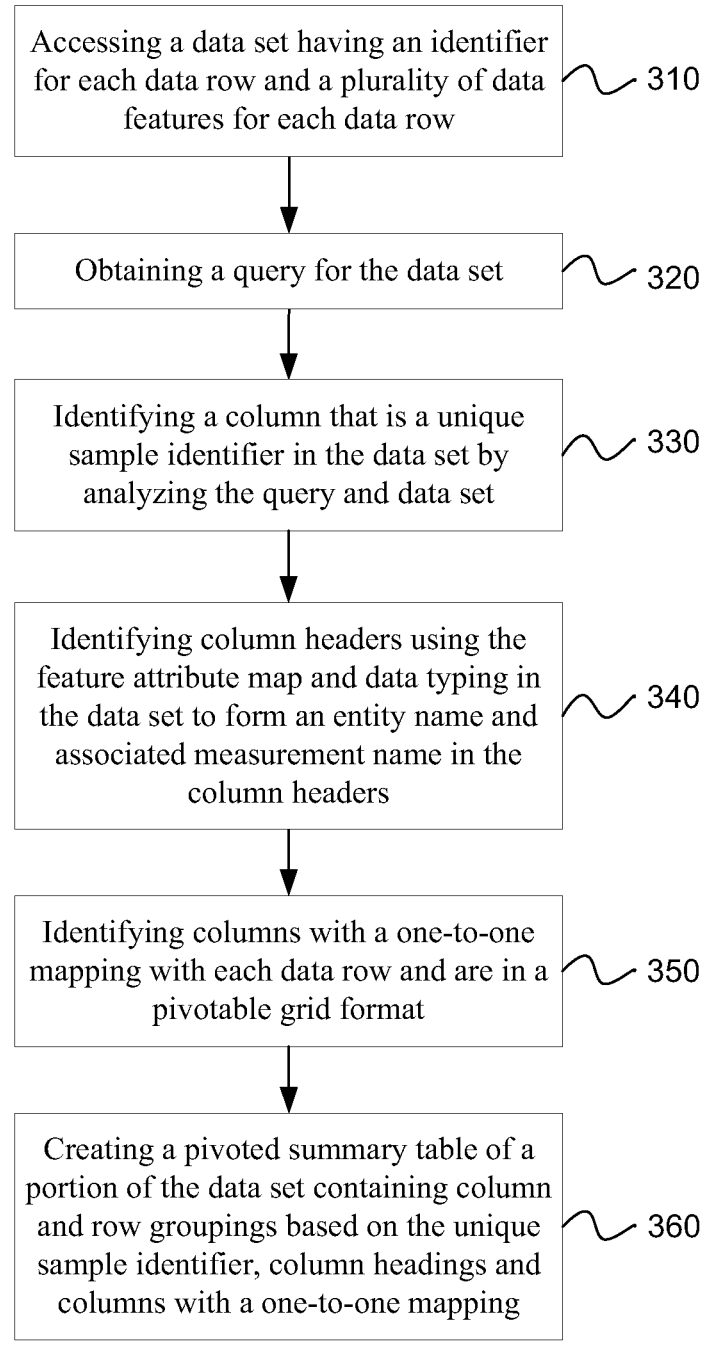
FIG. 3 is a flow chart illustrating an example method for transforming and summarizing data using a entity feature map.

FIG. 3 illustrates a method of transforming and summarizing data using a entity feature map. The method can include accessing a data set having an identifier for each data row and a plurality of data features for each data row, as in block 310. As mentioned before, the identifier can be a unique identifier. The data features may be columns in a data grid, data cube, or an irregular grid or data cube where the data features are a feature related to a sampling or measurement for that row.

A query can be obtained for the data set, as in block 320. The query can be a semantic query that is obtained from an end user. A column can be identified that is a unique sample identifier in the data set by analyzing the query and data set, as in block 330. Since the query is likely to contain a column that is a unique identifier, then this column can be identified by parsing and analyzing the text and structure of the semantic query. For example, one column may be designated as a key, the column may be indexed, or the column may be implicitly identified as a key. In other words, the query can be analyzed to find a column that uniquely identifies a row or sample by analyzing the query syntax tree to identify such a column.

A further operation is identifying column headers using the entity feature map and data typing in the data set to form an entity name and associated measurement name in the column headers, as in block 340. The entity feature map has entity-feature pairs that can be checked to see whether the features in the columns may make good candidate columns for the summary table header. This means that the system can find the identified data columns and examine the data type in the data columns to determine if that data type can be used for a column header. For example, a string or character type of column may be used as a column header whereas an integer, or floating point value are unlikely to be usable as column headers.

The columns with a one-to-one mapping with each data row can also be identified, as in block 350. Since this type of column has just one type of data for each row, then these columns are in a pivotable grid format and can be rotated based on this information. For example, a column of integers that has a one-to-one correspondence can be easily rotated and summarized.

A pivoted summary table of a portion of the data set can be created containing column and row groupings based on the unique sample identifier, column headings and columns with a one-to-one mapping, as in block 360.

Figure 4:
FIG. 4 illustrates a summarized table that has been summarized using a entity feature map.

FIG. 4 illustrates a simplified example of a pivoted summary table that may be created using the method of FIG. 3. In particular, the values Hp and Wt have been identified and used as column headers because of the original query and the data type of the "F" or flower column. However, the "M" or measurement column has been identified as having values and these values are not used as column headers. The values in the first column "#" have been identified as unique identifiers and the values in this column have been used as unique row identifiers. This table pivot is able to be generated by analyzing the table and the query to produce the pivoted output without user input. In addition, a entity feature map where the number of attributes is much greater than the example table.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The methods described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. The "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Furthermore, the described features, structures, or characteristics may be combined in any suitable manner in one or more embodiments. In the preceding description, numerous specific details were provided, such as examples of various configurations to provide a thorough understanding of embodiments of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method performed by a computing device having a processor, the method comprising:
  with the processor,
    applying a semantic query to an entity feature map to generate a data set, the entity feature map representing a plurality of entities with associated sample types, attributes, and values corresponding to the attributes, wherein the data set includes a plurality of data rows and data columns, each of the data rows containing a representation of one of the entities and each of the data columns containing a representation of one of the associated sample types, attributes, or the values corresponding to the attributes;

analyzing the representations of the entities contained in the data rows and the associated sample types, attributes, or the values corresponding to the attributes contained in the data columns to determine a probability distribution of the attributes; and predicting a likelihood of a sample type of a new entity having associated attributes and values corresponding to the attributes based on the determined probability distribution of the attributes.

2. The method of claim 1 wherein analyzing the entities includes:

identifying one of the data columns as containing a unique sample identifier for each of the entities in the data set by analyzing the semantic query; and creating a summary table of at least a portion of the data set containing column and row groupings based on the unique sample identifier.

3. The method of claim 1 wherein analyzing the entities includes:

identifying one of the data columns as containing a unique sample identifier for each of the entities in the data set by analyzing the semantic query;

identifying one or more columns as containing one or more attribute names using data typing in the data set; and creating a summary table of at least a portion of the data set, the summary table having the one or more attribute names as column headers.

4. The method of claim 1 wherein analyzing the entities includes:

identifying one of the data columns as containing a unique sample identifier for each of the entities in the data set by analyzing the semantic query;

identifying one or more columns as containing one or more attribute names using data typing in the data set; and creating a summary table of at least a portion of the data set, the summary table having the one or more attribute names as column headers and the corresponding values in the data columns.

5. The method of claim 1 wherein:

one of the data columns also contains a representation of an event; and analyzing the entities includes analyzing the entities contained in the data rows and the associated event contained in the one of data columns to determine a probability distribution of the event.

6. The method of claim 1 wherein:

one of the data columns also contains an event;

analyzing the entities includes analyzing the entities contained in the data rows and the associated event contained in the one of data columns to determine a probability distribution of the event; and the method further includes predicting a likelihood of an event for a new entity having associated attributes and corresponding values to the attributes based on the determined probability distribution of the event.

7. A memory device containing instructions that, when executed by a computing processor, causing the computing processor to perform a process comprising:

applying a semantic query to an entity feature map to generate a data set, the entity feature map representing a plurality of entities with associated sample types, attributes, and values corresponding to the attributes, wherein the data set includes a plurality of data rows and data columns, each of the data rows containing a representation of one of the entities and each of the data columns containing a representation of one of the associated sample types, attributes, or the values corresponding to the attributes;

analyzing the representations of the entities contained in the data rows and the associated sample types, attributes, or the values corresponding to the attributes contained in the data columns to determine a probability distribution of the attributes; and predicting a likelihood of a sample type of a new entity having associated attributes and values corresponding to the attributes based on the determined probability distribution of the attributes.

8. The memory device of claim 7 wherein analyzing the entities includes:

identifying one of the data columns as containing a unique sample identifier for each of the entities in the data set by analyzing the semantic query; and creating a summary table of at least a portion of the data set containing column and row groupings based on the unique sample identifier.

9. The memory device of claim 7 wherein analyzing the entities includes:

identifying one of the data columns as containing a unique sample identifier for each of the entities in the data set by analyzing the semantic query;

identifying one or more columns as containing one or more attribute names using data typing in the data set; and creating a summary table of at least a portion of the data set, the summary table having the one or more attribute names as column headers.

10. The memory device of claim 7 wherein analyzing the entities includes:

identifying one of the data columns as containing a unique sample identifier for each of the entities in the data set by analyzing the semantic query;

identifying one or more columns as containing one or more attribute names using data typing in the data set; and creating a summary table of at least a portion of the data set, the summary table having the one or more attribute names as column headers and the corresponding values in the data columns.

11. The memory device of claim 7 wherein:

one of the data columns also contains a representation of an event; and analyzing the entities includes analyzing the entities contained in the data rows and the associated event contained in the one of data columns to determine a probability distribution of the event.

12. The memory device of claim 7 wherein:

one of the data columns also contains an event;

analyzing the entities includes analyzing the entities contained in the data rows and the associated event contained in the one of data columns to determine a probability distribution of the event; and the process further includes predicting a likelihood of an event for a new entity having associated attributes and corresponding values to the attributes based on the determined probability distribution of the event.

13. A computing device, comprising:

a computing processor; and a memory operatively coupled to the processor, the memory containing instructions that, when executed by the computing processor, causing the computing processor to perform a process that includes:

applying a semantic query to an entity feature map to generate a data set, the entity feature map representing a plurality of entities with associated sample types, attributes, and values corresponding to the attributes, wherein the data set includes a plurality of data rows and data columns, each of the data rows containing a representation of one of the entities and each of the data columns containing a representation of one of the associated sample types, attributes, or the values corresponding to the attributes;

analyzing the representations of the entities contained in the data rows and the associated sample types, attributes, or the values corresponding to the attributes contained in the data columns to determine a probability distribution of the attributes; and predicting a likelihood of a sample type of a new entity having associated attributes and values corresponding to the attributes based on the determined probability distribution of the attributes.

14. The computing device of claim 13 wherein analyzing the entities includes:

identifying one of the data columns as containing a unique sample identifier for each of the entities in the data set by analyzing the semantic query; and creating a summary table of at least a portion of the data set containing column and row groupings based on the unique sample identifier.

15. The computing device of claim 13 wherein analyzing the entities includes:

identifying one of the data columns as containing a unique sample identifier for each of the entities in the data set by analyzing the semantic query;

identifying one or more columns as containing one or more attribute names using data typing in the data set; and creating a summary table of at least a portion of the data set, the summary table having the one or more attribute names as column headers.

16. The computing device of claim 13 wherein analyzing the entities includes:

identifying one of the data columns as containing a unique sample identifier for each of the entities in the data set by analyzing the semantic query;

identifying one or more columns as containing one or more attribute names using data typing in the data set; and creating a summary table of at least a portion of the data set, the summary table having the one or more attribute names as column headers and the corresponding values in the data columns.

17. The computing device of claim 13 wherein:

one of the data columns also contains a representation of an event; and analyzing the entities includes analyzing the entities contained in the data rows and the associated event contained in the one of data columns to determine a probability distribution of the event.

18. The computing device of claim 13 wherein:

one of the data columns also contains an event;

analyzing the entities includes analyzing the entities contained in the data rows and the associated event contained in the one of data columns to determine a probability distribution of the event; and the process further includes predicting a likelihood of an event for a new entity having associated attributes and corresponding values to the attributes based on the determined probability distribution of the event.

19. The computing device of claim 13 wherein analyzing the entities includes analyzing the entities contained in the data rows and the associated event contained in the one of data columns to determine a probability distribution of the event using logistic regression.

20. The computing device of claim 13 wherein analyzing the entities includes analyzing the entities contained in the data rows and the associated event contained in the one of data columns to determine a probability distribution of the event using classification.

* * * * *